United States Patent [19]

Diesel

[11] Patent Number: 5,583,774
[45] Date of Patent: Dec. 10, 1996

[54] ASSURED-INTEGRITY MONITORED-EXTRAPOLATION NAVIGATION APPARATUS

[75] Inventor: John W. Diesel, Woodland Hills, Calif.

[73] Assignee: Litton Systems, Inc., Woodland Hills, Calif.

[21] Appl. No.: 260,520

[22] Filed: Jun. 16, 1994

[51] Int. Cl.$^6$ ..................................... G01S 5/02
[52] U.S. Cl. ............................................... 364/443
[58] Field of Search ........................ 364/443, 449, 364/459; 73/178 R; 342/352, 356, 357, 451, 457

[56] References Cited

U.S. PATENT DOCUMENTS

| | | | |
|---|---|---|---|
| 4,032,759 | 6/1977 | Danik | 235/150.25 |
| 4,232,313 | 11/1980 | Fleishman | 343/6 R |
| 4,785,463 | 11/1988 | Jane et al. | 375/1 |
| 4,937,763 | 6/1990 | Mott | 364/550 |
| 5,019,992 | 5/1991 | Brown et al. | 364/468 |
| 5,343,209 | 8/1994 | Sennott et al. | 342/357 |
| 5,359,529 | 10/1994 | Snider | 364/449 |
| 5,365,447 | 11/1994 | Dennis | 364/449 |
| 5,416,712 | 5/1995 | Geier et al. | 364/450 |
| 5,430,654 | 7/1995 | Kyrtsos et al. | 364/449 |
| 5,442,557 | 8/1995 | Kaneko | 364/449 |
| 5,448,727 | 9/1995 | Annevelink | 395/600 |
| 5,449,367 | 9/1995 | Bamford et al. | 395/600 |
| 5,450,448 | 9/1995 | Sheynblat | 375/346 |
| 5,467,282 | 11/1995 | Dennis | 364/449 |
| 5,481,700 | 1/1996 | Thuraisingham | 395/600 |

OTHER PUBLICATIONS

Karatsinides, "Enhancing Filter Robustness in Cascaded GRS–INS Integrations", National Aerospace and Electronics, 1993 Conf., 1993, pp. 406–412.

Chaffee et al., "GPS Positioning, Filtering, and Integration", National Aerospace and Electronics, 1993 Conf., pp. 327–332.

Negast et al., "Compensation of Selected Availability Using a GPS/INS Extended Kalman Filter", National Aerospace and Electronics, 1992 Conf., 1992, pp. 356–362.

McMillan, "A GPS Attitude Error Model for Kalman Filtering", Position Location and Navigation, 1994 IEEE Conf., 1994, pp. 329–336.

Meyer–Hilberg et al., "High Accuracy Navigation and Landing System Using GPS/IMU System Integration", IEEE Aerospace and Electronic Systems Magazine, vol. 9, No. 7, Jul. 1994, pp. 11–17.

*Primary Examiner*—Kevin J. Teska
*Assistant Examiner*—Stephen J. Walder, Jr.
*Attorney, Agent, or Firm*—Robert E. Malm

[57] ABSTRACT

The assured-integrity monitored-extrapolation (AIME) navigation apparatus selectively utilizes measurements provided by ancillary sources at periodic intervals in determining the state of the platform on which the apparatus is mounted. The measurements have attributes which are measures of quality, quality being a measure of the usefulness of the measurement in accurately estimating the state of a platform. The AIME apparatus makes its selection of measurements for state determination on the basis of estimates of the values of these quality attributes. The determination of the quality of a time sequence of measured values of a particular quantity requires an evaluation time for its accomplishment. The AIME apparatus therefore determines the platform's state in two phases. It obtains highly-accurate determinations of the states of the platform at times prior to present time minus the evaluation time by using the quality measures available at these times and using only those measurements that are determined to be of high quality in the determination of state at these times. The platform state at present time is then obtained by extrapolation of the highly-accurate state at time minus the evaluation time using measurements whose quality is more uncertain.

89 Claims, 3 Drawing Sheets

ASSURED-INTEGRITY MONITORED-EXTRAPOLATION NAVIGATION APPARATUS

BACKGROUND OF INVENTION

This invention relates generally to navigation systems and apparatus and more particularly to integrated radio-inertial navigation systems and apparatus.

The National Aeronautical Association has described the Global Positioning System as "the most significant development for safe and efficient navigation and surveillance of air and spacecraft since the introduction of radio navigation 50 years ago." The Global Positioning System (GPS) consists of 24 globally-dispersed satellites with synchronized atomic clocks that transmit radio signals. Time, as measured by each satellite, is embedded in the transmitted radio signal of each satellite. The difference between the time embedded in a satellite's radio signal and a time measured at the point of reception of the radio signal by a clock synchronized to the satellite clocks is a measure of the range of the satellite from the point of reception. Since the clocks in the system cannot be maintained in perfect synchronism, the measure of range is referred to as "pseudorange" because it includes both a satellite clock error anti the clock error at the point of reception.

Each satellite transmits, in addition to its clock time, its position in an earth-fixed coordinate system and its own clock error. A user, by measuring the pseudoranges to four satellites and correcting the pseudoranges for the satellite clock errors, can first of all determine his actual range to each satellite and his own clock error. The user can then determine his own position in the earth-fixed coordinate system, knowing his range to each of the four satellites and the position of each satellite in the earth-fixed coordinate system.

GPS by itself is unsatisfactory as a sole means of navigation for civil aviation users. GPS has been designed to have extensive self-test features built into the system. However, a slowly increasing range bias error could occur due to satellite clock faults or due to errors in the uploaded data introduced as a result of human errors at the GPS Operational Control System Facility. Since such failures could affect users over a wide area, the Federal Aviation Authority requires that, even for approval as a supplemental navigation system, the system have "integrity" which is defined by the Federal Radio Navigation Plan (U.S. Dept. of Defense, DOD-4650.4 and U.S. Dept. of Transportation, DOT-TSC-RSPA-87-3 1986, DOT-TSC-RSPA-88-4 1988) as the ability to provide timely warnings to users when the system should not be used for navigation. For sole means of navigation, the system must also have sufficient redundancy that it can continue to function despite failure of a single component. For the non-precision approach phase of flight, a timely warning is 10 seconds. The present GPS integrity-monitoring system in the Operation Control System may take hours. A GPS "integrity channel" has been proposed to provide the integrity-monitoring function.

Because of the high cost of the GPS integrity channel, "receiver autonomous integrity monitoring" (RAIM) has been proposed wherein a receiver makes use of redundant satellite information to check the integrity of the navigation solution. It is sufficient to simply detect a satellite failure in the case of supplemental navigation. However, to detect a satellite failure using RAIM requires that at least five satellites with sufficiently good geometry be available.

For a sole means of navigation, it is also necessary to isolate the failed satellite and to be able to navigate with the remaining satellites. This requires that at least six satellites with sufficiently good geometry be available. To meet the integrity limit of 0.3 n.m. required for a non-precision approach, the availability of the five satellites, as required for supplemental navigation, is only 95 to 99 percent, depending on assumptions. However, the availability of the six satellites required for sole means is only 60 or 70 percent, which is totally inadequate.

If an inertial reference system (IRS) is also available, an attempt could be made to coast through integrity outage periods when the five satellites required for integrity are not available. Such periods sometimes last more than 10 minutes. An IRS which has not been calibrated in flight by GPS has a velocity accuracy specification of eight knots, 2 dRMS. It would therefore not be capable of meeting the accuracy requirement during such integrity outage periods. Moreover, for sole means of navigation it might also be necessary to coast through periods when six satellites were unavailable, in case a failure of one of these were detected. Since such periods can last more than an hour, the accuracy requirement cannot be achieved with an IRS uncalibrated by GPS.

The problem with calibrating the IRS with GPS using a conventional Kalman filter is that a GPS failure can contaminate the integrated GPS/IRS solution before the failure is detected. If the GPS failure causes a pseudorange error drift of less than one meter/sec., it cannot be detected by tests of the Kalman filter residuals.

BRIEF SUMMARY OF INVENTION

The assured-integrity monitored-extrapolation (AIME) navigation apparatus selectively utilizes measurements provided by ancillary navigation data sources at periodic intervals in determining the state of the platform on which the apparatus is mounted.

Examples of ancillary sources that can be used with the AIME apparatus are a global positioning system receiver and an inertial reference system. The measurements supplied to the AIME apparatus are all presumptively useful in determining the state of the platform. However, some measurements may be more efficacious in achieving accurate state determinations. The AIME apparatus selects those measurements that are likely to result in the highest accuracy.

In general, the measurements have attributes which are measures of quality, quality being a measure of the usefulness of the measurement in accurately estimating the state of a platform. The AIME apparatus makes its selection of measurements for state determination on the basis of estimates of the values of these quality attributes. These estimates may be obtained either from an external source or as a result of a process performed by the AIME apparatus.

The determination of the quality of a time sequence of measured values of a particular quantity requires an evaluation time for its accomplishment. The AIME apparatus therefore determines the platform's state in two phases. It obtains highly-accurate determinations of the states of the platform at times prior to present time minus the evaluation time by using the quality measures available at these times and using only those measurements that are determined to be of high quality in the determination of platform state at these times. The platform state at present time is then obtained by extrapolation of the accurately-determined state at time minus the evaluation time using measurements whose quality is more uncertain.

DESCRIPTION OF THE PREFERRED EMBODIMENT

The purpose of the assured-integrity monitored-extrapolation (AIME) navigation apparatus is to identify the satellites whose clock drifts are within specification and to use only those satellites within specification in estimating the user's position.

Figure 1:
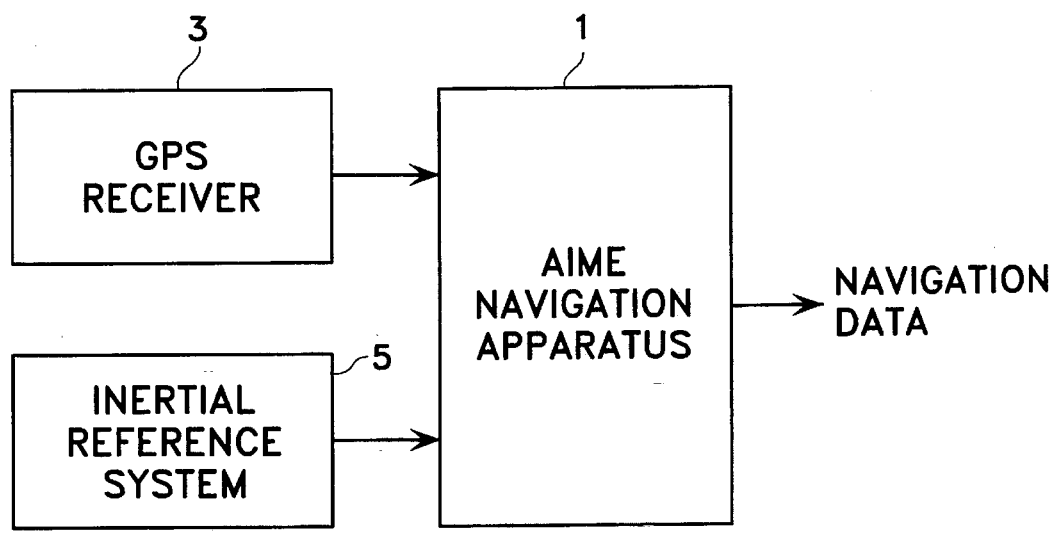
FIG. 1 shows a block diagram of the assured-integrity monitored-extrapolation (AIME) navigation apparatus, a global positioning system receiver, and an inertial navigation system.

As shown in FIG. 1, the AIME navigation apparatus 1 operates in conjunction with a GPS receiver 3 and an inertial reference system 5 to produce navigation data for the platform on which it is installed by means of a Kalman filter process. The preferred embodiment of the AIME navigation apparatus utilizes an Intel 80960 microprocessor and memory resources.

Figure 2:
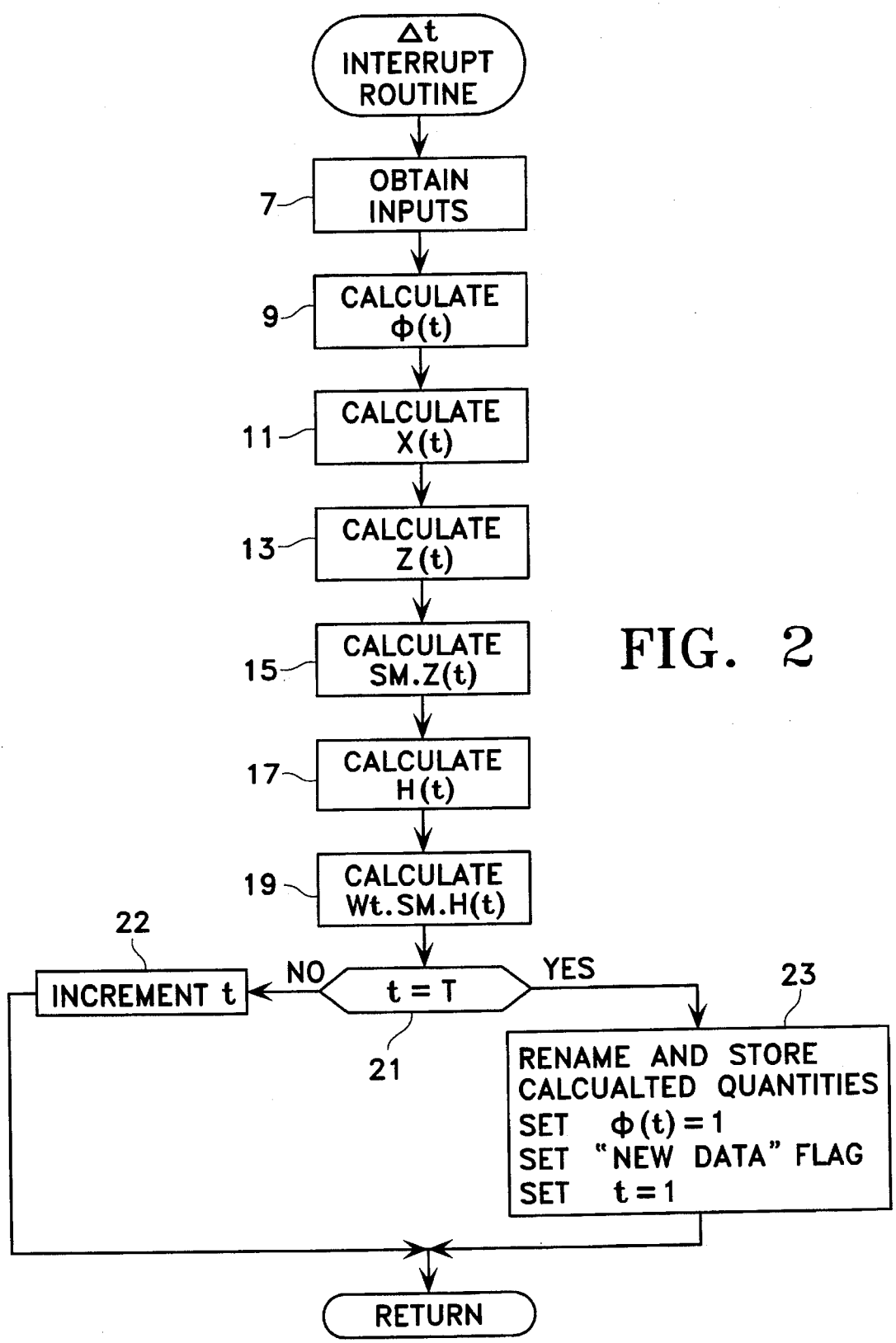
FIG. 2 shows the flow diagram for the interrupt routine which is performed each time new data is available to the AIME navigation apparatus.

The interrupt routine shown in FIG. 2 details the operations regularly performed by the AIME apparatus at $\Delta t$ intervals where $\Delta t$ for the preferred embodiment is 1 second. In step 7, input data is obtained from the GPS receiver 3 and the inertial reference system 5.

The GPS receiver 3 supplies ARINC 743 quantities comprising the pseudorange $PR_i$ to each satellite i within view and the coordinates $X_{Si}$, $Y_{Si}$, and $Z_{Si}$ of each satellite in an earth-fixed/earth-centered coordinate system. The AIME apparatus is designed to accommodate up to N satellites at a time. Thus, the index i takes on values from 1 to N. The value of N for the preferred embodiment is 8.

The platform to which the AIME apparatus and the associated GPS and IRS equipments are mounted is a dynamic system which exists in a state that can be characterized by a state vector—a set of state variables that define in whole or in part the platform's position and orientation in space and the first and second derivatives with respect to time of its position. It is convenient in the present case to deal with the error-state vector which is the difference between the true state vector for the platform and the state vector as determined by the IRS.

The IRS supplies the following ARINC 704 quantities relating to the position, velocity, acceleration, and attitude of the IRS/GPS/AIME platform at intervals $\Delta t$.

| Symbol | Definition |
|---|---|
| $\phi, \lambda, h$ | latitude, longitude, altitude; |
| $V_N, V_z$ | northerly and easterly velocity components; |
| $A_T, A_C, A_V$ | along-track, cross-track, and vertical acceleration components; |
| $\Psi_T$ | track angle; |
| $\Psi_H, \theta, \phi$ | heading, pitch, and roll. |

The transition matrix $\phi(t)$ is defined by the equation $$\phi(t) = I + \sum_{n=1}^{t} F(n)\Delta t \qquad (1)$$

where I (=Kronecker delta $\delta_{ij}$) is the unit matrix and the integer t measures time in increments of $\Delta t$. The integer takes on values from 1 to T, T being a design parameter. The value of T for the preferred embodiment is 150.

In step 9 of FIG. 2, the transition matrix $\phi(t)$ is obtained by adding $F(t)\Delta t$ to the prior value of $\phi(t)$, the prior value of $\phi(t)$ being the unit matrix when t equals 1.

The dynamics matrix $F=[F_{ij}]$ transforms the error-state vector into the time rate of change of the error-state vector, as shown by the equation $$\dot{x} = Fx \qquad (2)$$

For M=8 the dynamics matrix has 23 rows and 23 columns. The non-zero components of the dynamics matrix are defined as follows:

$F_{1,4} = -(1/R_y)$
$F_{2,3} = 1/R_x$
$F_{3,6} = -(A_z)$  $F_{3,7} = A_y$  $F_{3,11} = C_{xx}$  $F_{3,12} = C_{xy}$
$F_{4,5} = A_z$  $F_{4,7} = -(A_x)$  $F_{4,11} = C_{yx}$  $F_{4,12} = C_{yy}$
$F_{5,2} = -\omega_E$  $F_{5,4} = -(1/R_y)$  $F_{5,6} = \omega_z$  $F_{5,7} = -\omega_y$
$F_{5,8} = C_{xx}$  $F_{5,9} = C_{xy}$  $F_{5,10} = C_{xz}$
$F_{6,1} = \omega_z$  $F_{6,3} = 1/R_x$  $F_{6,5} = -\omega_z$  $F_{6,7} = \omega_x$
$F_{6,8} = C_{yx}$  $F_{6,9} = C_{yy}$  $F_{6,10} = C_{yz}$
$F_{7,1} = -\omega_y$  $F_{7,2} = \omega_x$  $F_{7,5} = \omega_y$  $F_{7,6} = -\omega_x$
$F_{7,8} = C_{zx}$  $F_{7,9} = C_{zy}$  $F_{7,10} = C_{zz}$
$F_{8,8} = -(1/\tau_G)$  $F_{9,9} = -(1/\tau_G)$  $F_{10,10} = -(1/\tau_G)$
$F_{11,11} = -(1/\tau_A)$  $F_{12,12} = -(1/\tau_A)$
$F_{13,14} = 1$
$F_{14,14} = -(1/\tau_r)$
$F_{15,15} = -(1/\tau_b)$
$F_{16,16} = -(1/\tau_R)$  $F_{17,17} = -(1/\tau_R)$  $F_{18,18} = -(1/\tau_R)$  $F_{19,19} = -(1/\tau_R)$
$F_{20,20} = -(1/\tau_R)$  $F_{21,21} = -(1/\tau_R)$  $F_{22,22} = -(1/\tau_R)$  $F_{23,23} = -(1/\tau_R)$ The quantities $R_x$ and $R_y$ are the radii of curvature in the x and y directions respectively of the oblate spheroid that is used to model the earth. The values of these quantities are obtained from the equations $$\frac{1}{R_x} = \frac{\cos^2\alpha}{R_N} + \frac{\sin^2\alpha}{R_M} \qquad (3)$$

$$\frac{1}{R_y} = \frac{\cos^2\alpha}{R_M} + \frac{\sin^2\alpha}{R_N}$$

The radius of the earth along a meridian $R_M$ and the radius normal to a meridian $R_N$ are defined by equations (4) in terms of the equatorial radius a, the eccentricity e of the oblate spheroid that is used to model the earth, the wander-azimuth angle $\alpha$, and the latitude $\phi$.

$$R_M = \frac{\alpha(1-e^2)}{(1-e^2\sin^2\phi)^{3/2}} \qquad (4)$$

$$R_N = \frac{\alpha}{(1-e^2\sin^2\phi)^{1/2}}$$

The wander-azimuth angle $\alpha$ is the angle of rotation of the y-axis counter-clockwise from North. The wander-azimuth angle is obtained from the equation $$\alpha(t) = \alpha_0 + \sum_{n=1}^{t} \frac{V_E(n)}{R_N} \tan\phi(n)\Delta t \qquad (5)$$

where $\alpha_0$ is equal to the IRS platform heading $\psi_H$ for the first summation and is equal to the $\alpha(T)$ of the previous summation for each subsequent summation.

The IRS platform acceleration components in the x-y-z coordinate system are given by the equations $$A_x = A_T\sin(\alpha+\psi_T) + A_C\cos(\alpha+\psi_T)$$

$$A_y = A_T\cos(\alpha+\psi_T) - A_C\sin(\alpha+\psi_T) \qquad (6)$$

$$A_z = A_V + g$$

where g is the acceleration of gravity.

The angular velocity components in the x-y-z coordinate system are given by the equations $$\omega_x = \rho_x + \Omega_x$$

$$\omega_y = \rho_y + \Omega_y \qquad (7)$$

$$\omega_z = \rho_z + \Omega_z$$

The components in the x-y-z coordinate system of the IRS platform angular velocity $\rho$ are given by the equations $$\rho_x = -\frac{V_y}{R_y} \qquad (8)$$

$$\rho_y = \frac{V_x}{R_x}$$

$$\rho_z = 0$$

where $$V_x = V_E\cos\alpha + V_N\sin\alpha$$

$$V_y = -V_E\sin\alpha + V_N\cos\alpha \qquad (9)$$

The components in the x-y-z coordinate system of the earth angular velocity $\Omega_E$ are given by the equations $$\Omega_x = \Omega_E\cos\phi\sin\alpha$$

$$\Omega_y = \Omega_E\cos\phi\cos\alpha \qquad (10)$$

$$\Omega_z = \Omega_E\sin\phi$$

The coordinate transformation matrix $C = [C_{ij}]$, where the indices i and j take on the values x, y, and z, transforms vector components referenced to a body-fixed coordinate system on the IRS platform to vector components referenced to the x-y-z coordinate system. For example, the transformation from body-fixed acceleration components $[A^B_{ij}]$ to x-y-z components $[A_{ij}]$ is accomplished in the following way.

$$\begin{bmatrix} A_x \\ A_y \\ A_z \end{bmatrix} = \begin{bmatrix} C_{xx} & C_{xy} & C_{xz} \\ C_{yx} & C_{yy} & C_{yz} \\ C_{zx} & C_{zy} & C_{zz} \end{bmatrix} \begin{bmatrix} A_x^B \\ A_y^B \\ A_z^B \end{bmatrix} \qquad (11)$$

The direction cosines $C_{ij}$ in these equations are computed from the IRS ARINC 704 heading, pitch, and roll outputs.

The $\tau$'s are the correlation times for the correlated error states. The values are as follows: $\tau_G=3600$ s, $\tau_A=300$ s, $\tau_r=600$ s, $\tau_h=1200$ s, and $\tau_R=3600$ s. The diagonal elements of the process noise covariance matrix Q are obtained from the correlation times and the initial values for the diagonal elements of the error-state covariance matrix P(0) by means of the equation $$Q_{nn} = \frac{2P_{nn}(0)}{\tau_n} \qquad (12)$$

The values for the error-state covariance matrix are as follows: $P_{GG}(0) = (0.1 \text{ degrees/hr})^2$, $P_{AA}(0) = (25 \text{ ug})^2$, $P_{rr}(0) = (0.1 \text{ m/s})^2$, $P_{hh}(0) = (100 \text{ m})^2$, and $P_{RR}(0) = (30 \text{ m})^2$. In the case of Kalman filters denoted below by indices between 1 and M, the value of $P_{RR}(0)$ for the satellite being tested is $(1000 \text{ m})^2$. The double subscripts are intended to identify the quantities and also to indicate that the quantities are the diagonal elements of the covariance matrix. The zero in parentheses indicates that the quantities are initial values. For satellite-related quantities, the elements are inserted when a satellite first comes into view. For IRS quantities, the elements are inserted at equipment startup.

The 23 components of the error-state vector $x(t) = [x_i]$ for the Kalman filter processing are defined as follows:

| | | | | |
|---|---|---|---|---|
| $x_1 = d\theta_x$ | $x_2 = d\theta_y$ | $x_3 = dV_x$ | $x_4 = dV_y$ | $x_5 = d\phi_x$ |
| $x_6 = d\phi_y$ | $x_7 = d\phi_z$ | $x_8 = dGB_x$ | $x_9 = dGB_y$ | $x_{10} = dGB_z$ |
| $x_{11} = dAB_x$ | $x_{12} = dAB_y$ | $x_{13} = dB$ | $x_{14} = dB_r$ | $x_{15} = dh_B$ |
| $x_{16} = dRB_1$ | $x_{17} = dRB_2$ | $x_{18} = dRB_3$ | $x_{19} = dRB_4$ | $x_{20} = DRB_5$ |
| $x_{21} = dRB_6$ | $x_{22} = dRB_7$ | $x_{23} = dRB_8$ | | |

The error-state terms are referenced to a local-level wander-azimuth coordinate system having its origin at the IRS. The error-state terms have the following meanings.

| Symbol | Definition |
|---|---|
| $d\theta_x, d\theta_y$ | horizontal angular position errors; |
| $dV_x, dV_y$ | horizontal velocity errors; |
| $d\phi_x, d\phi_y, d\phi_z$ | alignment errors; |
| $dGB_x, dGB_y, DGB_z$ | gyro bias errors; |
| $dAB_x, dAB_y$ | horizontal accelerometer bias errors; |
| $dB$ | GPS receiver clock bias error; |
| $dB_r$ | GPS receiver clock rate bias error; |
| $dh_B$ | error in barometric-inertial output; |
| $dRB_i$ | GPS range bias error for i'th satellite, i taking on the values from 1 through M. (This error is caused by satellite clock drift, atmospheric errors, or low-frequency "selective availability" errors. "Selective availability" is the process by which the GPS managers deliberately introduce satellite timing and position errors into the satellite transmissions for the purpose of reducing the accuracy of position determination by civilian and unauthorized users of the system.) |

The error-state vector extrapolated to time t is defined by the equation $$x(t) = \phi(t)x(k=K) \qquad (13)$$

where $x_{M+1}(k=K)$ is the present estimate of the error-state vector obtained during the previous execution of the main program.

In step 11 of FIG. 2 $x(t)$ is obtained using equation (13).

The measurements vector $z(t)$ is obtained from the components of $x(t)$. New values of longitude, latitude, and altitude are first determined from the equations $$d\theta_N = d\theta_x \sin\alpha + d\theta_y \cos\alpha$$

$$d\theta_E = d\theta_x \cos\alpha - d\theta_y \sin\alpha \qquad (14)$$

$$d\lambda = d\theta_N \cos\phi$$

$$d\phi = -d\theta_E \qquad (15)$$

$$\lambda = \lambda_{ARINC704} + d\lambda$$

$$\phi = \phi_{ARINC704} + d\phi \qquad (16)$$

$$h_B = H_{B\ ARINC704} + dh_B$$

The quantities $\lambda_{ARINC704}$, $\phi_{ARINC704}$, and $h_{B\ ARINC704}$ in equation (16) denote the ARINC 704 values of $\lambda$, $\phi$, and $h_B$.

The updated values of $\lambda$, $\phi$, and $h_B$ from equation (16) are used to calculate updated values for the position coordinates $X_I$, $Y_I$, and $Z_I$ of the IRS in an earth-fixed/earth-centered coordinate system by means of the equations $$X_I = (R_N + h_B)\cos\phi\cos\lambda$$

$$Y_I = (R_N + h_B)\cos\phi\sin\lambda \qquad (17)$$

$$Z_I = [R_N(1-e^2) + h_B]\sin\phi$$

The ranges $R_{ci}$ to the satellites and the direction cosines of the vector connecting the IRS platform to each of the satellites in the earth-fixed/earth-centered coordinate system are calculated using equations (18) and (19). The index i denotes a particular satellite.

$$R_{ci} = \sqrt{(X_{Si} - X_I)^2 + (Y_{Si} - Y_I)^2 + (Z_{Si} - Z_I)^2} \qquad (18)$$

$$e_{xi}^E = \frac{(X_{Si} - X_I)}{R_{ci}} \qquad (19)$$

$$e_{yi}^E = \frac{(Y_{Si} - Y_I)}{R_{ci}}$$

$$e_{zi}^E = \frac{(Z_{Si} - Z_I)}{R_{ci}}$$

The direction cosines to local level reference axes are obtained using equation (20). The symbol "C" denotes "cosine" and the symbol "S" denotes "sine".

$$\begin{bmatrix} e_{xi} \\ e_{yi} \\ y_{zi} \end{bmatrix} = \begin{bmatrix} C\alpha & S\alpha & 0 \\ -S\alpha & C\alpha & 0 \\ 0 & 0 & 1 \end{bmatrix} \begin{bmatrix} 1 & 0 & 0 \\ 0 & C\phi & -S\phi \\ 0 & S\phi & C\phi \end{bmatrix} \begin{bmatrix} C\lambda & 0 & -S\lambda \\ 0 & 1 & 0 \\ S\lambda & 0 & C\lambda \end{bmatrix} \begin{bmatrix} 0 & 1 & 0 \\ 0 & 0 & 1 \\ 1 & 0 & 0 \end{bmatrix} \begin{bmatrix} e_{xi}^E \\ e_{yi}^E \\ e_{zi}^E \end{bmatrix} \qquad (20)$$

The computed pseudorange to the i'th satellite $PR_{ic}$ is obtained using equation (21). The quantity B is the GPS receiver clock bias.

$$PR_{ic} = R_{ci} - B - dB - dRB_i \qquad (21)$$

Finally, the value of zi for each satellite is obtained using equation (22) and the pre-filtered measured pseudorange $PR_i^+$.

$$z_i = PR_{ic} - PR_i^+ \qquad (22)$$

Figure 3:
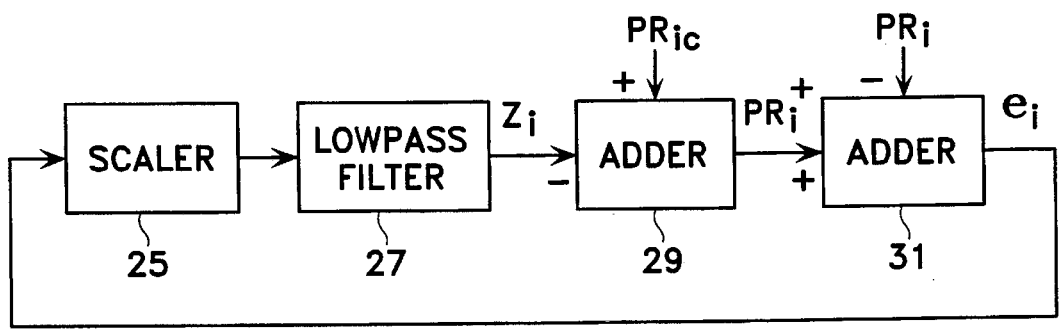
FIG. 3 shows a functional block diagram of a digitally-implemented processor for obtaining the difference between the smoothed measured psuedorange to a satellite and the computed pseudorange.

Equation (22) is solved with the digitally-implemented processor shown in block diagram form in FIG. 3. The function of the processor is to reduce the high-frequency noise due to "selective availability". "Selective availability" is the process by which the GPS managers deliberately introduce satellite timing and position errors into the satellite transmissions for the purpose of reducing the accuracy of position determination by civilian and unauthorized users of the system.

The processor in FIG. 3 consists of the scaler 25, the lowpass filter 27, the adder 29, and the adder 31. The output of the adder 31 is the difference $e_i$ between the filtered pseudorange $PR^+_i$ and the pseudorange $PR_i$ supplied by the GPS receiver. This difference is substantially increased in amplitude by the scaler 25 and then filtered by the lowpass filter 27 having a time constant of about $T\Delta t$ thereby rapidly attenuating noise components with frequencies above about $1/T\Delta t$ Hz. The output $z_i$ of the lowpass filter 27 is subtracted from $PR_{ic}$ by adder 29 to give $PR^+_i$ in accordance with equation (22).

The sum of $z(t)$ over all values of t, denoted by $sm.z(t)$, is defined by the equation $$sm.z(t) = \sum_{n=1}^{t} z(n) \qquad (23)$$

The quantity $sm.z(t)$ is obtained by adding $z(t)$ to the prior value of $sm.z(t)$.

The vector $z(t)$ $(=[z_i(t)])$ is related to the error-state vector $x(t)$ $(=[x_j])$ by the equation $$z(t) = H(t)x(t) + v(t) \qquad (24)$$

The matrix H $(=[H_{ij}])$ is called the observation matrix. The vector components $v_i(t)$ are measurement noise. The index i denotes an association with the i'th satellite and takes on the values from 1 to M.

The index j takes on the values from 1 to 23, the number of error-state components.

The values of $H_{ij}$ are zero except as follows: $H_{i,1} = -R_y e_{yi}$, $H_{i,2} = R_x e_{xi}$, $H_{i,13} = 1$, $H_{i,15} = e_{zi}$, $H_{i,i+15} = 1$. The values of $H_{ij}$ are calculated in step 17.

The weighted sum of H(t), denoted by $wt.sm.H(t)$, is defined by the equation $$wt.sm.H(t) = \sum_{n=1}^{t} H(n)\phi(n) \qquad (25)$$

In step 19 of FIG. 2, wt.sm.H(t) is obtained by adding H(t)φ(t) to the prior value of wt.sm.H(t).

In step 21 the value of t is tested. If t is not equal to T, t is incremented in step 22 and a return to the main program is executed. If t is equal to T, the vectors x(t) and (1/T)sm.z(t) and the matrices Φ(t) and (1/T)wt.sm.H(t) are stored in memory in step 23 with the following names:

$$x(t=T) = x(k=K+1) \quad (26)$$
$$x(t=0) = x_E(k=K)$$
$$\frac{1}{T} sm.z(t=T) = z(k=K)$$
$$\phi(t=T) = \phi(k=K)$$
$$\frac{1}{T} wt.sm.H(t=T) = H(k=K)$$

A "new data" flag is set and a return to the main program is then executed.

Previously stored data are assigned k-values ranging from 1 to K, the k=1 data being the oldest and the k=K data being the most recent. Newly-calculated data replaces the oldest data so that there are always K sets of data available in memory. The parameter K is equal to 12 in the preferred embodiment.

A range bias validity flag $VRB_i(k)$ is associated with each set of k-indexed data. If satellite i goes out of view, $VRB_i$ is set equal to 0. If satellite i is new in view, $VRB_i$ is set equal to 1.

The main program is comprised of M+2 Kalman filters—filters 1 through M for testing each of the M satellites, the (M+1)'th filter for updating present position, and the (M+2)'th filter for updating position 12 iterations in the past.

A Kalman filter is a minimal mean-square-error method for estimating the error-state vector x(k) and its covariance matrix P(k) based on new measured data z(k), the previous estimates x(k−1) and P(k−1), the transition matrix φ(k), and the observation matrix H(k). Since the Kalman filter methodology is well understood in the art and details are readily available in a number of textbooks (e.g. A. Gelb, ed., *Applied Optimal Estimation,* The Analytical Sciences Corporation, The M.I.T. Press, Cambridge, Mass., 1974), details of the Kalman filter calculations will not be discussed herein.

Satellite data for a maximum of M satellites are saved in tables in the k-indexed portion of memory. As each satellite goes out of view, its entries in the table are zeroed, and the corresponding row and column of the covariance matrix for the range bias for that satellite are zeroed. The diagonal element is reinitialized with the initial variance of the range bias error.

When a new satellite comes into view, the data associated with the new satellite is placed in the first available empty position in the table. When a satellite represented in the table goes out of view, its data entries in the k-indexed memory are zeroed. The measurements for a newly-viewable satellite and its observation matrix are entered into the first available satellite slot at k=K.

The value of M is chosen such that the probability of more than M satellites being viewable at one time is low. However, if more than M satellites are viewable, those satellites that will remain in view for the longest periods of time are entered and allowed to remain in the tables.

Figure 4:
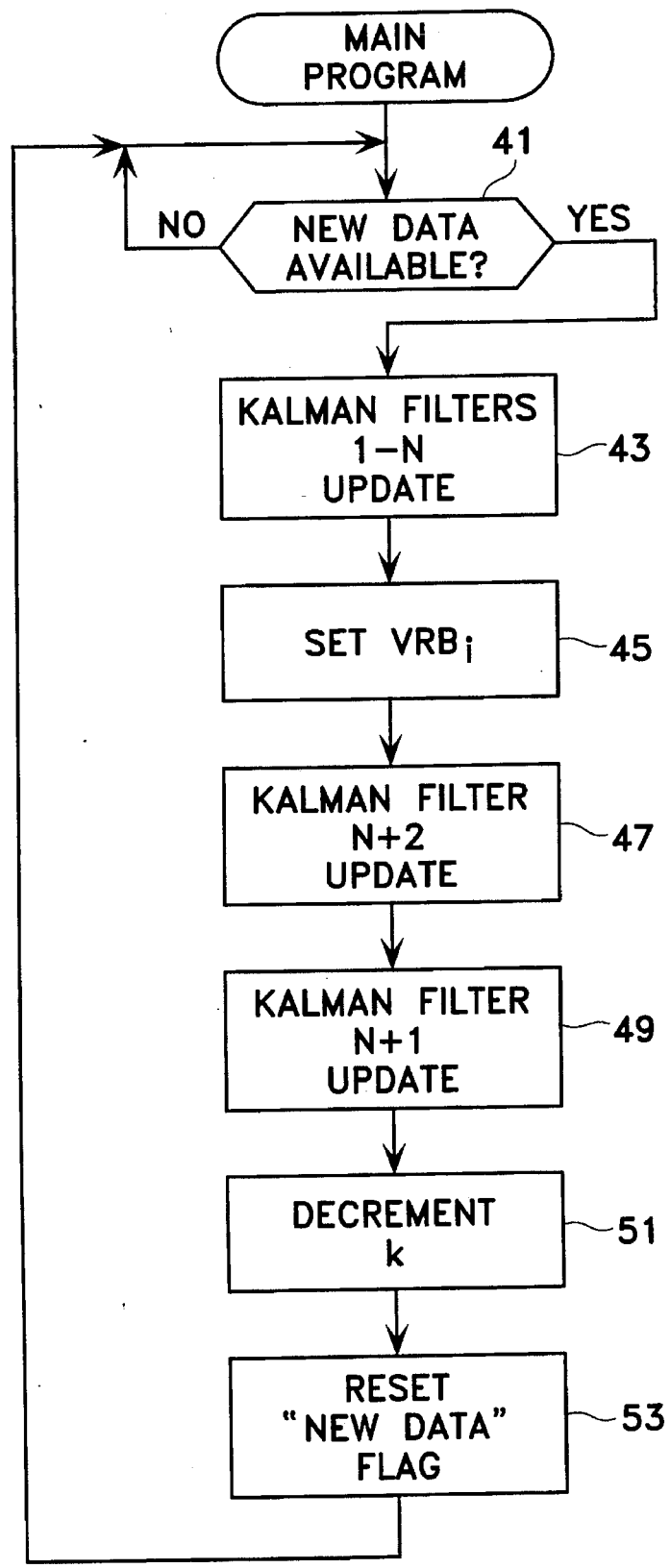
FIG. 4 shows the flow diagram for the main program of the AIME navigation apparatus.

The flow diagram for the main program is shown in FIG. 4. In step 41, the microprocessor continually checks the status of the "new data" flag. When the flag indicates that new data is available in memory, the microprocessor proceeds to simultaneously test the validity of individual satellite data for all satellites represented in the satellite tables by means of M Kalman filters operating in parallel.

The i'th Kalman filter, which is used to test satellite i, has an extra error-state component $dRB_{ri}$ which is defined as the range bias rate error for satellite i. For M=8, this component becomes error-state component $x_{24}$. The additional non-zero dynamics matrix elements for this state are: $F_{15+i,24}=1$ and $F_{24,24}=-(1/\tau_{Rr})$. The value of the correlation time $\tau_{Rr}$ is 3600 s. The value of the diagonal element in the covariance matrix is: $P_{RrRr}(0)=(1 \text{ m/s})^2$.

Each of the testing Kalman filters uses all of the measured satellite pseudorange data but is initialized with large variances for the range bias error and the range bias rate error for the satellite it is testing when that satellite first comes into view.

In step 43 the M Kalman filters update their calculations of the error-state vector and the covariance matrix utilizing the k=K data. The error-state vector used in calculating the measurement vector $z_i(k=K)$ was $x_z(k=K)=x_{(M+1)}(k=K)$ from the (M+1)'th Kalman filter. The error-state vector $x_j(k=K-)$ was obtained by the j'th Kalman filter as a result of the previous updating. A measurement vector $z_{ij}(k=K)$ consistent with $x_j(k=K-)$ is obtained from the equation $$z_{ij}(k=K)=z_i(k=K)+H[x_j(k=K-)-x_z(k=K)] \quad (27)$$

Using $x_j(k=K-)$ and $z_{ij}(k=K)$ the M testing Kalman filters update the error-state vector and the covariance matrix. The updated error-state vector and covariance matrix are stored in memory locations indexed by k=1 which will be reindexed later in the program to k=K prior to the next updating.

In step 45 the validity flags $VRB_i$ are set. The Kalman filter model for testing a satellite is based on the assumption that the particular satellite it is testing may be out of specification insofar as the satellite's clock drift is concerned. If for satellite i, the i'th Kalman filter estimated standard deviation of the range bias error is less than a specified maximum acceptable standard deviation for testing, and the estimated range bias error is less than a specified maximum acceptable value, the validity flag $VRB_i(k)$ is set equal to 2 for k=K.

If for satellite i, the Kalman filter estimated standard deviation of the range bias rate error is less than a specified maximum acceptable standard deviation for testing, and the range bias rate error estimate is less than a specified maximum acceptable value, the validity flag $VRB_i(k)$ is set equal to 3 for all values of k for which the satellite has been in view.

The test period is equal to $KT\Delta t$ which for the preferred embodiment is equal to 30 minutes. The probability of two satellites unexpectedly failing during the same 30-minute interval is negligible. It is therefore reasonable to assume that all satellites other than satellite i are within specification when testing satellite i for failure. The test hypotheses are therefore:

$H_0(i)$: All satellites other than satellite i are within specification and satellite i is also within specification;

$H_1(i)$: All satellites other than satellite i are within specification and satellite i is out of specification.

When the failure hypothesis for all satellites in view has been tested, all satellites which have been determined to be within specification 30 minutes in the past with validity flag $VRB_i(k=1) =3$ are used by the (M+2)'th Kalman filter to determine the error-state vector $x_{M+2}(k=1+)$ and the associated covariance matrix in step 47. The Kalman filter utilizes error-state vector $x_{M+2}(k=1-)$, its associated covariance matrix, and the other data indexed at k=1.

The error-state vector used in calculating the measurement vector $z_i(k=1)$ was $x_z(k=1)$ from the (M+1)'th Kalman filter with k=K at that time in the past. The error-state vector $x_{M+2}(k=1-)$ was obtained by the (M+2)'th Kalman filter as a result of the previous updating. A measurement vector $z_{ii}(k=1)$ consistent with $x_{M+2}(k=1-)$ is obtained from the equation $$z_M(k=1)=z_i(k=1)+H[x_{M+2}(k=1-)-x_z(k=1)] \qquad (28)$$

In step 49 all satellites which have been determined to be within specification with validity flag $VRB_i(k)>1$ are used by the (M+1)'th Kalman filter in the k'th iteration to determine the error-state vector $x_{M+1}(k=K+)$ and its associated covariance matrix. The (M+1)'th Kalman filter begins the updating process with the k=1 data. The Kalman filter utilizes error-state vector $x_{M+2}(k=1-)$, its associated covariance matrix, and the other data indexed at k=1 to obtain updated error-state vector $x_{M+1}(k=1+)$.

The error-state vector used in calculating the measurement vector $z_i(k=1)$ was $x_z(k)$ from the (M+1)'th Kalman filter with k=K at that time in the past. The error-state vector $x_{M+2}(k=1-)$ was obtained by the (M+2)'th Kalman filter as a result of the microprocessor's previous execution of the main program. The measurement vector $z_{ii}(k=1)$ is again defined by equation (27).

The (M+1)'th Kalman filter continues the updating process with the k=2 data. The Kalman filter utilizes error-state vector $x_{M+1}(k=2-)=\phi(k=1)x_{M+1}(k=1+)$, its associated covariance matrix, and the data indexed at k=2 to obtain updated error-state vector $x_{M+1}(k=2+)$.

The error-state vector used in calculating the measurement vector $z_i(k=2)$ was $x_z(k=2)$ from the (M+1)'th Kalman filter with k=K at that time in the past. The error-state vector $x_{M+1}(k=1+)$ was obtained by the (M+1)'th Kalman filter as a result of the k=1 updating. A measurement vector $z_{ii}(k=2)$ consistent with $x_{M+1}(k=1+)$ is obtained from the equations $$x_{M+1}(k=2-)=\phi(k=1)x_{M+1}(k=1+) \; Z_{ii}(k=2)=z_i(k=2)+H[x_{M+1}(k=2-)-x_z(k=2)] \qquad (29)$$

The (M+1)'th Kalman filter continues the updating process in the same manner for k=3, k=4, . . . , k=K. At each step, the residuals for each measurement are saved in memory. After k=K, the residuals for each satellite are averaged over the entire interval to detect a slow satellite clock drift.

In step 51 the k indices of the memory locations are decremented by 1 so that K becomes K−1, K−1 becomes K−2, . . . , 2 becomes 1, and 1 becomes K. The measurements $z_i(k=K)$ and $x_z(k=K)$ will not be available until they are calculated in equation (26) as z(k=K) and x(k=K) in step 23 of FIG. 2. In step 53 the "new data" flag is reset. The updating process is now complete and the microprocessor returns to the beginning of the main program.

The preferred embodiment as described herein performs the measurements that establish the quality of the measurements supplied by the GPS for determining platform position. In particular, if a slow clock drift for a particular satellite is detected, that satellite's measurements are not used. The AIME apparatus could also perform its intended function if the quality measurements were supplied by an external source.

What is claimed is:

1. A navigation apparatus comprising a digital processor and a memory that utilizes a first subset and a second subset of a set of measured quantities which do not vary by amounts that are improbable or impossible, the set of measured quantities being provided at periodic time intervals delta-time by an external source for determining the state of a platform on which the apparatus is mounted, the set of measured quantities being presumptively useful in determining platform state, the number of members of the first subset being equal to or greater than zero but less than the total number of members of the set of measured quantities, the members of the set of measured quantities not included in the first subset being subject to selection for the second subset by the apparatus in accordance with a predetermined set of selection rules.

2. The navigation apparatus of claim 1 wherein the measured quantities subject to selection for the second subset have one or more attributes, the apparatus utilizing estimates of the attributes in selecting the members of the second subset.

3. The navigation apparatus of claim 2 wherein the one or more attributes of a measured quantity subject to selection for the second subset are measures of quality, quality being a measure of the usefulness of the measured quantity in accurately estimating the state of a platform.

4. The navigation apparatus of claim 2 wherein the estimates of the attributes are provided by an external source.

5. The navigation apparatus of claim 2 wherein the estimates of the attributes are determined by the apparatus from the measured quantities.

6. The navigation apparatus of claim 5 wherein the measured quantities for a time period extending from present time minus a predetermined time to present time are used in the determination of the estimates of the attributes.

7. The navigation apparatus of claim 5 wherein the estimates of the attributes and the state of the platform are determined by a minimal mean-square-error process.

8. The navigation apparatus of claim 7 wherein the minimal mean-square-error process is a Kalman filter.

9. The navigation apparatus of claim 8 wherein, using Kalman filter terminology, a differential observation vector substitutes for the observation vector and a differential state vector substitutes for the state vector, the differential observation vector being the difference between the actual observation vector and the observation vector that would be obtained if the actual state of the platform were the same as the estimated state, the differential state vector being the difference between the actual state vector and the state vector that would be obtained if the actual state of the platform were the same as the estimated state, an average differential observation vector being obtained by averaging the differential observation vector over T delta-time time intervals, an average differential state vector being obtained by averaging the differential state vector over T delta-time time intervals, an average observation matrix being obtained by averaging the product of the t-transition matrix and the observation matrix over T delta-time time intervals, the t-transition matrix being the matrix which extrapolates the differential state vector t delta-time intervals into the future, T being a predetermined integer greater than 1 and t being any integer from 1 to T, the Kalman filter extrapolating the differential state vector by T delta-time intervals by means of the T-transition matrix, the Kalman filter transforming the extrapolated differential state vector into the differential observation vector for the same time by means of the average observation matrix, the Kalman filter obtaining the associated covariance matrix and the filter gain matrix by means of the T-transition matrix and the average observation matrix.

10. The navigation apparatus of claim 9 wherein values of the average differential state vector, the average differential observation vector, the average observation matrix, and the T-transition matrix are calculated and retained in the memory for at least KT delta-time intervals, K being an integer.

11. The navigation apparatus of claim 10 wherein the calculated values retained in memory are used in the determination of the estimates of the attributes.

12. The navigation apparatus of claim 11 wherein the estimates of the attributes and the state of the platform are determined by a minimal mean-square-error process.

13. The navigation apparatus of claim 12 wherein the minimal mean-square-error process is a Kalman filter.

14. The navigation apparatus of claim 1 wherein a predetermined first set of selection rules pertain to state determinations prior to a time equal to present time minus a predetermined time interval and a predetermined second set of selection rules pertain to state determinations from present time minus the predetermined time interval to present time.

15. The navigation apparatus of claim 14 wherein the state of the platform is determined by a first minimal mean-square-error process prior to present time minus the predetermined time interval and by a second minimal mean-square-error process from present time minus the predetermined time interval to present time.

16. The navigation apparatus of claim 15 wherein the first minimal mean-square-error process is a first Kalman filter and the second minimal mean-square-error process is a second Kalman filter, the state vector and the covariance matrix obtained by the first Kalman filter at present time minus the predetermined time interval being inputs to the second Kalman filter.

17. The navigation apparatus of claim 16 wherein, using Kalman filter terminology, a differential observation vector substitutes for the observation vector and a differential state vector substitutes for the state vector, the differential observation vector being the difference between the actual observation vector and the observation vector that would be obtained if the actual state of the platform were the same as the estimated state, the differential state vector being the difference between the actual state vector and the state vector that would be obtained if the actual state of the platform were the same as the estimated state, an average differential observation vector being obtained by averaging the differential observation vector over T delta-time time intervals, an average differential state vector being obtained by averaging the differential state vector over T delta-time time intervals, an average observation matrix being obtained by averaging the product of the t-transition matrix and the observation matrix over T delta-time time intervals, the t-transition matrix being the matrix which extrapolates the differential state vector t delta-time intervals into the future, T being a predetermined integer greater than 1 and t being any integer from 1 to T, the Kalman filter extrapolating the differential state vector by T delta-time intervals by means of the T-transition matrix, the Kalman filter transforming the extrapolated differential state vector into the differential observation vector for the same time by means of the average observation matrix, the Kalman filter obtaining the associated covariance matrix and the filter gain matrix by means of the T-transition matrix and the average observation matrix, the first and second Kalman filters using the same calculated T-transition matrices and average observation matrices.

18. The navigation apparatus of claim 17 wherein values of the average differential state vector, the average differential observation vector, the average observation matrix, and the T-transition matrix are calculated and retained in the memory for at least KT delta-time intervals, K being an integer.

19. The navigation apparatus of claim 18 wherein the calculated values retained in memory are used in the determination of the state of the platform.

20. The navigation apparatus of claim 19 wherein the estimates of the state of the platform are determined by a minimal mean-square-error process.

21. The navigation apparatus of claim 20 wherein the minimal mean-square-error process is a Kalman filter.

22. The navigation apparatus of claim 1 wherein the state of the platform is determined by a minimal mean-square-error process.

23. The navigation apparatus of claim 22 wherein the minimal mean-square-error process is a Kalman filter.

24. The navigation apparatus of claim 23 wherein, using Kalman filter terminology, a differential observation vector substitutes for the observation vector and a differential state vector substitutes for the state vector, the differential observation vector being the difference between the actual observation vector and the observation vector that would be obtained if the actual state of the platform were the same as the estimated state, the differential state vector being the difference between the actual state vector and the state vector that would be obtained if the actual state of the platform were the same as the estimated state, an average differential observation vector being obtained by averaging the differential observation vector over T delta-time time intervals, an average differential state vector being obtained by averaging the differential state vector over T delta-time time intervals, an average observation matrix being obtained by averaging the product of the t-transition matrix and the observation matrix over T delta-time time intervals, the t-transition matrix being the matrix which extrapolates the differential state vector t delta-time intervals into the future, T being a predetermined integer greater than 1 and t being any integer from 1 to T, the Kalman filter extrapolating the differential state vector by T delta-time intervals by means of the T-transition matrix, the Kalman filter transforming the extrapolated differential state vector into the differential observation vector for the same time by means of the average observation matrix, the Kalman filter obtaining the associated covariance matrix and the filter gain matrix by means of the T-transition matrix and the average observation matrix.

25. The navigation apparatus of claim 24 wherein values of the average differential state vector, the average differential observation vector, the average observation matrix, and the T-transition matrix are calculated and retained in the memory for at least KT delta-time intervals, K being an integer.

26. The navigation apparatus of claim 25 wherein the calculated values retained in memory are used in the determination of the state of the platform.

27. The navigation apparatus of claim 26 wherein the estimates of the state of the platform are determined by a minimal mean-square-error process.

28. The navigation apparatus of claim 27 wherein the minimal mean-square-error process is a Kalman filter.

29. The navigation apparatus of claim 1 wherein the measured quantities subject to selection for the second subset are the measured ranges to a plurality of earth satellites.

30. The navigation apparatus of claim 29 wherein the measured quantities have one or more attributes, the apparatus utilizing estimates of one or more of the attributes in selecting the members of the second subset.

31. The navigation apparatus of claim 30 wherein the one or more attributes of a measured quantity are measures of quality, quality being a measure of the usefulness of the measured quantity in accurately estimating the state of a platform.

32. The navigation apparatus of claim 31 wherein the range to each satellite includes a range bias error RBE, the behavior of the RBE for each satellite as a function of time being representable by the expression $[RBE_0+RBE_1 \cdot (TIME-TIME_0)]$ where TIME denotes time and $RBE_0$ and $RBE_1$ are equal to RBE and the time rate of change of RBE respectively at TIME equal to $TIME_0$, the quantities $RBE_0$, $var\_RBE_0$, $RBE_1$, and $var\_RBE_1$ constituting quality attributes, $var\_RBE_0$ and $var\_RBE_1$ being the variances of $RBE_0$ and $RBE_1$ respectively, smaller magnitudes of $RBE_0$, $var\_RBE_0$, $RBE_1$, and $var\_RBE_1$ being associated with a higher quality.

33. The navigation apparatus of claim 32 wherein the predetermined set of selection rules are that a range measurement is selected if $var\_RBE_0$ does not exceed a first threshold.

34. The navigation apparatus of claim 32 wherein the predetermined set of selection rules are that a range measurement is selected if $var\_RBE_0$ does not exceed a first threshold and $RBE_0$ does not exceed a second threshold.

35. The navigation apparatus of claim 32 wherein the predetermined set of selection rules are that a range measurement is selected if $var\_RBE_0$ does not exceed a first threshold, $RBE_0$ does not exceed a second threshold, and $RBE_1$ does not exceed a third threshold.

36. The navigation apparatus of claim 1 wherein the set of measured quantities includes at least one satellite measured quantity and at least one measured quantity from a second source, the satellite measured quantities comprising the range and range rate for a plurality of earth satellites, the satellite measured quantities as functions of time being associated with noise spectral densities that are functions of frequency, the second-source measured quantities comprising the position, velocity, and acceleration of the platform, the second-source measured quantities as functions of time being associated with noise spectral densities that are functions of frequency, the noise spectral density for satellite measured quantities being greater than that for second-source measured quantities at high frequencies, the noise spectral density for satellite measured quantities being less than that for second-source measured quantities at low frequencies, the second-source measured quantities included in the set of measured quantities being in the first subset, the satellite measured quantities included in the set of measured quantities being subject to selection for the second subset.

37. The navigation apparatus of claim 1 wherein the set of measured quantities includes at least one satellite measured quantity and at least one inertial reference system measured quantity, the satellite measured quantities comprising the range and range rate for a plurality of earth satellites, the inertial reference system measured quantities comprising the position, velocity, and acceleration of the inertial reference system, the inertial reference system measured quantities included in the set of measured quantities being in the first subset, the satellite measured quantities included in the set of measured quantities being subject to selection for the second subset.

38. The navigation apparatus of claim 37 wherein the measured quantities subject to selection for the second subset have one or more attributes, the apparatus utilizing estimates of one or more of the attributes in selecting the members of the second subset.

39. The navigation apparatus of claim 38 wherein the one or more attributes of a measured quantity subject to selection for the second subset are measures of quality, quality being a measure of the usefulness of the measured quantity in accurately estimating the state of a platform.

40. The navigation apparatus of claim 39 wherein the range to each satellite includes a range bias error RBE, the behavior of the RBE for each satellite as a function of time being representable by the expression $[RBE_0+RBE_1 \cdot (TIME-TIME_0)]$ where TIME denotes time and $RBE_0$ and $RBE_1$ are equal to RBE and the time rate of change of RBE respectively at TIME equal to $TIME_0$, the quantities $RBE_0$, $var\_RBE_0$, $RBE_1$, and $var\_RBE_1$ constituting quality attributes, $var\_RBE_0$ and $var\_RBE_1$ being the variances of $RBE_0$ and $RBE_1$ respectively, smaller magnitudes of $RBE_0$, $var\_RBE_0$, $RBE_1$, and $var\_RBE_1$ being associated with a higher quality.

41. The navigation apparatus of claim 40 wherein the quantities $RBE_0$, $var\_RBE0$, $RBE_1$, and $var\_RBE_1$ for a specified satellite are determined by solving the navigation problem with a Kalman filter, the input values for $var\_RBE_0$ and $var\_RBE_1$ for the specified satellite that are supplied to the Kalman filter being sufficiently large that the estimated errors in $RBE_0$ and $RBE_1$ and the estimated values of $var\_RBE_0$ and $var\_RBE_1$ obtained by the Kalman filter for the specified satellite are essentially determined by the other satellites.

42. The navigation apparatus of claim 40 wherein the predetermined set of selection rules are that a range measurement is selected if $var\_RBE_0$ does not exceed a first threshold.

43. The navigation apparatus of claim 40 wherein the predetermined set of selection rules are that a range measurement is selected if $var\_RBE_0$ does not exceed a first threshold and $RBE_0$ does not exceed a second threshold.

44. The navigation apparatus of claim 40 wherein the predetermined set of selection rules are that a range measurement is selected if $var\_RBE_0$ does not exceed a first threshold, $RBE_0$ does not exceed a second threshold, and $RBE_1$ does not exceed a third threshold.

45. The navigation apparatus of claim 39 wherein the quality of a target satellite's measured quantities is determined by solving the satellite-inertial navigation problem with a Kalman filter, the input values for the variances of the target satellite's measured quantities being large enough to assure that the estimates of the measured quantities and the variances of the measured quantities for the target satellite are essentially determined by the other satellites, the quality of the target satellite's measured quantities being determined by the degree to which estimates of the target satellite's measured quantities and the variances of the measured quantities approach those of the other satellites.

46. The navigation apparatus of claim 39 wherein the measured quantities for a time period extending from present time minus a predetermined time to present time are used in the determination of the estimates of the attributes.

47. The navigation apparatus of claim 46 wherein the estimates of the attributes and the state of the platform are determined by a minimal mean-square-error process.

48. The navigation apparatus of claim 47 wherein the minimal mean-square-error process is a Kalman filter process.

49. The navigation apparatus of claim 48 wherein the Kalman filter error states for the platform include one or more of the group consisting of position errors, velocity errors, navigation axis misalignment errors, gyro bias errors, acceleration bias errors, barometric altitude bias error, and barometric altitude bias rate error.

50. The navigation apparatus of claim 48 wherein the Kalman filter error states for the satellite system include one or more of the group consisting of receiver clock bias error, receiver clock bias rate error, range bias error, and range bias rate error.

51. The navigation apparatus of claim 48 wherein the residuals in the Kalman filter solution pertaining to satellite measured quantities are attributes of those quantities.

52. The navigation apparatus of claim 48 wherein the satellite measured quantities selected for the second subset are used to estimate the satellite-inertial navigation system state and the error states associated therewith at present time minus the predetermined time interval, the selection of the satellite measured quantities being based on the estimates of their attributes exceeding a predetermined first quality level.

53. The navigation apparatus of claim 52 wherein the satellite measured quantities selected for the second subset are used to estimate the satellite-inertial navigation system state and the error states associated therewith at present time, the selection of the satellite measured quantities being based on the estimates of their attributes exceeding a predetermined second quality level, the inputs to the Kalman filter being the outputs of the Kalman filter at present time minus the predetermined time interval, the second quality level being lower than the first quality level.

54. The navigation apparatus of claim 52 wherein the inertial navigation system, having been calibrated by the Kalman filter at present time minus the predetermined time interval, operates independently when the estimates of the attributes of the satellite measured quantities all fail to exceed the predetermined first quality level.

55. The navigation apparatus of claim 48 wherein the difference between estimates of the range bias error at present time minus the predetermined time and at present time for each satellite is a quality attribute for the measured quantities associated with that satellite, the difference being called the drift rate, the lower the drift rate, the higher the quality.

56. The navigation apparatus of claim 46 wherein the values of at least one satellite measured quantity are retained in memory for a predetermined time and then discarded, the predetermined time being longer than the correlation time of the noise in the satellite measured quantity.

57. The navigation apparatus of claim 46 wherein weighted sums of the values of at least one satellite measured quantity are computed at T delta-time intervals, retained in memory for a predetermined time, and then discarded, T being a predetermined integer, the predetermined time being longer than the correlation time of the noise in the satellite measured quantity.

58. A method that utilizes a first subset and a second subset of a set of measured quantities which do not vary by amounts that are improbable or impossible, the set of measured quantities being provided at periodic time intervals delta-time by an external source for determining the state of a platform, the measured quantities being presumptively useful in determining platform state, the number of members of the first subset being equal to or greater than zero but less than the total number of members of the set of measured quantities, the members of the set of measured quantities not included in the first subset being subject to selection for the second subset in accordance with a predetermined set of selection rules, the method comprising the steps:

selecting the measured quantities in the second subset;

determining the state of the platform.

59. The method of claim 58 wherein the measured quantities subject to selection for the second subset have one or more attributes and estimates of one or more of the attributes are utilized in selecting the members of the second subset.

60. The method of claim 59 wherein the one or more attributes of a measured quantity subject to selection for the second subset are measures of quality, quality being a measure of the usefulness of the measured quantity in accurately estimating the state of a platform.

61. The method of claim 59 wherein the estimates of the attributes are provided by an external source.

62. The method of claim 59 further comprising the step:

determining the estimates of the attributes from the measured quantities.

63. The method of claim 62 wherein the estimates of the attributes and the state of the platform are determined by a minimal mean-square-error process.

64. The method of claim 63 wherein the minimal mean-square-error process is a Kalman filter process.

65. The method of claim 64 wherein, using Kalman filter terminology, a differential observation vector substitutes for the observation vector and a differential state vector substitutes for the state vector, the differential observation vector being the difference between the actual observation vector and the observation vector that would be obtained if the actual state of the platform were the same as the estimated state, the differential state vector being the difference between the actual state vector and the state vector that would be obtained if the actual state of the platform were the same as the estimated state, the step of determining the state of the platform comprising the steps:

obtaining an average differential observation vector by averaging the differential observation vector over T delta-time time intervals;

obtaining an average differential state vector by averaging the differential state vector over T delta-time time intervals;

obtaining an average observation matrix by averaging the product of the t-transition matrix and the observation matrix over T delta-time time intervals, the t-transition matrix being the matrix which extrapolates the differential state vector t delta-time intervals into the future, T being a predetermined integer greater than 1 and t being any integer from 1 to T;

extrapolating the differential state vector by T delta-time intervals by means of the T-transition matrix;

transforming the extrapolated differential state vector into the differential observation vector for the same time by means of the average observation matrix;

obtaining the associated covariance matrix and the filter gain matrix by means of the T-transition matrix and the average observation matrix.

66. The method of claim 65 further comprising the steps:

calculating the values of the average differential state vector, the average differential observation vector, the average observation matrix, and the T-transition matrix at T delta-time intervals;

retaining the calculated values for at least KT delta-time intervals, K being an integer.

67. The method of claim 58 wherein a first predetermined set of selection rules pertain to state determinations prior to a time equal to present time minus a predetermined time interval and a second predetermined set of selection rules pertain to state determinations from present time minus the predetermined time interval to present time.

68. The method of claim 67 wherein the state determining step comprises the steps:

determining the platform state by a first minimal mean-square-error process prior to present time minus the predetermined time interval;

determining the platform state by a second minimal mean-square-error process from present time minus the predetermined time interval to present time.

69. The method of claim 68 wherein the first minimal mean-square-error process is a first Kalman filter process and the second minimal mean-square-error process is a second Kalman filter process, the method further comprising the step:

using the state vector and the covariance matrix obtained by the first Kalman filter process at present time minus the predetermined time interval as inputs to the second Kalman filter process.

70. The method of claim 58 wherein the state of the platform is determined by a minimal mean-square-error process.

71. The method of claim 70 wherein the minimal mean-square-error process is a Kalman filter process.

72. The method of claim 71 wherein, using Kalman filter terminology, a differential observation vector substitutes for the observation vector and a differential state vector substitutes for the state vector, the differential observation vector being the difference between the actual observation vector and the observation vector that would be obtained if the actual state of the platform were the same as the estimated state, the differential state vector being the difference between the actual state vector and the state vector that would be obtained if the actual state of the platform were the same as the estimated state, the step of determining the state of the platform comprising the steps:

obtaining an average differential observation vector by averaging the differential observation vector over T delta-time time intervals;

obtaining an average differential state vector by averaging the differential state vector over T delta-time time intervals;

obtaining an average observation matrix by averaging the product of the t-transition matrix and the observation matrix over T delta-time time intervals, the t-transition matrix being the matrix which extrapolates the differential state vector t delta-time intervals into the future, T being a predetermined integer greater than 1 and t being any integer from 1 to T;

extrapolating the differential state vector by T delta-time intervals by means of the T-transition matrix;

transforming the extrapolated differential state vector into the differential observation vector for the same time by means of the average observation matrix;

obtaining the associated covariance matrix and the filter gain matrix by means of the T-transition matrix and the average observation matrix.

73. The method of claim 72 further comprising the steps:

calculating the values of the average differential state vector, the average differential observation vector, the average observation matrix, and the T-transition matrix at T delta-time intervals;

retaining the calculated values for at least KT delta-time intervals, K being an integer.

74. The method of claim 71 wherein, using Kalman filter terminology, a differential observation vector substitutes for the observation vector and a differential state vector substitutes for the state vector, the differential observation vector being the difference between the actual observation vector and the observation vector that would be obtained if the actual state of the platform were the same as the estimated state, the differential state vector being the difference between the actual state vector and the state vector that would be obtained if the actual state of the platform were the same as the estimated state, the step of determining the state of the platform comprising the steps:

obtaining an average differential observation vector by averaging the differential observation vector over T delta-time time intervals;

obtaining an average differential state vector by averaging the differential state vector over T delta-time time intervals;

obtaining an average observation matrix by averaging the product of the t-transition matrix and the observation matrix over T delta-time time intervals, the t-transition matrix being the matrix which extrapolates the differential state vector t delta-time intervals into the future, T being a predetermined integer greater than 1 and t being any integer from 1 to T;

extrapolating the differential state vector by T delta-time intervals by means of the T-transition matrix;

transforming the extrapolated differential state vector into the differential observation vector for the same time by means of the average observation matrix;

obtaining the associated covariance matrix and the filter gain matrix by means of the T-transition matrix and the average observation matrix.

75. The method of claim 74 further comprising the steps:

calculating the values of the average differential state vector, the average differential observation vector, the average observation matrix, and the T-transition matrix at T delta-time intervals;

retaining the calculated values for at least KT delta-time intervals, K being an integer.

76. The method of claim 58 wherein the measured quantities are the measured ranges to a plurality of earth satellites, none of the measured quantities being in the first subset.

77. The method of claim 76 wherein the measured quantities have one or more attributes and estimates of one or more of the attributes are utilized in selecting the members of the second subset.

78. The method of claim 77 wherein the one or more attributes of a measured quantity are measures of quality, quality being a measure of the usefulness of the measured quantity in accurately estimating the state of a platform.

79. The method of claim 78 wherein the range to each satellite includes a range bias error RBE, the behavior of the RBE for each satellite as a function of time being representable by the expression $(RBE_0 + RBE_1 \cdot TIME)$ where $RBE_0$ and $RBE_1$ are constants and TIME denotes time, $RBE_0$, $s.d.RBE_0$, and $RBE_1$ constituting quality attributes, $s.d.RBE_0$ being the standard deviation of $RBE_0$, smaller magnitudes of $RBE_0$, $s.d.RBE_0$, and $RBE_1$ being associated with a higher quality.

80. The method of claim 79 wherein the predetermined set of selection rules are that a range measurement is selected if $s.d.RBE_0$ does not exceed a first threshold.

81. The method of claim 79 wherein the predetermined set of selection rules are that a range measurement is selected if $s.d.RBE_0$ does not exceed a first threshold and $RBE_0$ does not exceed a second threshold.

82. The method of claim 79 wherein the predetermined set of selection rules are that a range measurement is selected if $s.d.RBE_0$ does not exceed a first threshold, $RBE_0$ does not exceed a second threshold, and $RBE_1$ does not exceed a third threshold.

83. The method of claim 58 wherein the set of measured quantities are the measured ranges to a plurality of earth satellites and the position, velocity, and acceleration of the platform measured by an inertial reference system, the position, velocity, and acceleration measurements by the inertial reference system being in the first subset, the measured ranges being subject to selection for the second subset.

84. The method of claim 83 wherein the measured quantities subject to selection for the second subset have one or more attributes and estimates of one or more of the attributes are utilized in selecting the members of the second subset.

85. The method of claim 84 wherein the one or more attributes of a measured quantity subject to selection for the second subset are measures of quality, quality being a measure of the usefulness of the measured quantity in accurately estimating the state of a platform.

86. The method of claim 85 wherein the range to each satellite includes a range bias error RBE, the behavior of the RBE for each satellite as a function of time being representable by the expression $(RBE_0+RBE_1.TIME)$ where $RBE_0$ and $RBE_1$ are constants and TIME denotes time, $RBE_0$, $s.d.RBE_0$, and $RBE_1$ constituting quality attributes, $s.d.RBE_0$ being the standard deviation of $RBE_0$, smaller magnitudes of $RBE_0$, $s.d.RBE_0$, and $RBE_1$ being associated with a higher quality.

87. The method of claim 86 wherein the predetermined set of selection rules are that a range measurement is selected if $s.d.RBE_0$ does not exceed a first threshold.

88. The method of claim 86 wherein the predetermined set of selection rules are that a range measurement is selected if $s.d.RBE_0$ does not exceed a first threshold and $RBE_0$ does not exceed a second threshold.

89. The method of claim 86 wherein the predetermined set of selection rules are that a range measurement is selected if $s.d.RBE_0$ does not exceed a first threshold, $RBE_0$ does not exceed a second threshold, and $RBE_1$ does not exceed a third threshold.

* * * * *